US006279150B1

(12) United States Patent
Bachmann

(10) Patent No.: US 6,279,150 B1
(45) Date of Patent: Aug. 21, 2001

(54) METHOD FOR CONVERTING AN OBJECT CODE INTO A PROGRAM CODE

(75) Inventor: Werner Bachmann, München (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/486,522

(22) PCT Filed: Aug. 17, 1999

(86) PCT No.: PCT/DE98/02374

§ 371 Date: Feb. 28, 2000

§ 102(e) Date: Feb. 28, 2000

(87) PCT Pub. No.: WO99/12094

PCT Pub. Date: Mar. 11, 1999

(30) Foreign Application Priority Data

Sep. 1, 1997 (DE) .............................................. 197 38 162

(51) Int. Cl.⁷ ...................................................... G06F 9/45
(52) U.S. Cl. .................................................. 717/5; 717/7
(58) Field of Search ............................................. 717/5, 7

(56) References Cited

U.S. PATENT DOCUMENTS

| | | | |
|---|---|---|---|
| 4,667,290 | 5/1987 | Goss et al. ............................. | 717/7 |
| 4,751,740 | * 6/1988 | Wright ................................... | 717/5 |
| 4,791,558 | 12/1988 | Chaitin et al. ......................... | 717/5 |
| 5,274,818 | * 12/1993 | Vasilevsky et al. ................... | 717/7 |
| 5,313,614 | 5/1994 | Goettelmann et al. ................ | 717/5 |
| 5,551,015 | * 8/1996 | Goettelmann et al. ................ | 717/5 |
| 5,577,231 | * 11/1996 | Scalzi et al. .......................... | 717/5 |
| 5,577,233 | * 11/1996 | Goettelmann et al. ................ | 717/5 |
| 5,701,499 | * 12/1997 | Bates et al. ........................... | 717/5 |
| 5,724,590 | * 3/1998 | Goettelmann et al. ................ | 717/7 |
| 5,768,564 | * 6/1998 | Andrews et al. ...................... | 717/5 |
| 5,925,124 | * 7/1999 | Hilgendorf et al. ................... | 712/227 |
| 5,930,510 | * 7/1999 | Beylin et al. ......................... | 717/9 |
| 5,966,536 | * 10/1999 | Ravichandran ....................... | 717/9 |
| 6,000,028 | * 12/1999 | Chernoff et al. ...................... | 712/226 |
| 6,003,143 | * 12/1999 | Kim et al. ............................. | 717/5 |
| 6,023,583 | * 2/2000 | Honda ................................... | 717/5 |
| 6,031,993 | * 2/2000 | Andrews et al. ...................... | 717/7 |

FOREIGN PATENT DOCUMENTS

| | | |
|---|---|---|
| 196 17 842 A1 | 11/1997 | (DE) . |
| 0 372 835 A2 | 6/1990 | (EP) . |
| 05020135A * | 1/1993 | (JP) .............................. G06F/11/34 |
| WO 97/42574 | 11/1997 | (WO) . |

OTHER PUBLICATIONS

Cristina Cifuentes et al., "A Methodology for Decompilation", XIX Conferncia Latinoamericana de Informatica, Buenos Aires, Argentinien Aug 2–6, 1992, pp. 257–266.

Richard L. Sites et al., "Binary Translation", Communications fo the Association for Computing Machinery, vol. 36, No. 2, Feb. 1993, pp. 69–81.

Kristy Andrews et al., "Migrating a Cisc Computer Family onto Risc Via Object Code Translation", ACM Sigplan Notices, vol. 27, No. 9, Sep. 1992, pp. 213–222.

* cited by examiner

Primary Examiner—Mark R. Powell
Assistant Examiner—Kelvin Booker
(74) Attorney, Agent, or Firm—Schiff Hardin & Waite

(57) ABSTRACT

A method for converting an object code (OC1) for a source hardware (M1) into an equivalent program code (PC2) that comprises a program part (PT2) and a data part (DT2), whereby a code transformer (CT) analyzes each command of the object code (OC1) for the source hardware (M) and generates at least one corresponding entry in the program part (PT2) of the program code (PC2) from it is developed in that at least one data part (DT1) of the object code (OC1) for the source hardware (M1) and at most the complete object code (OC1) for the source hardware (M1) is accepted into the data part (DT2) of the program code (PC2). Such a method is flexible and offers high efficiency both in the conversion as well as in the running of the converted program code (PC2).

10 Claims, 3 Drawing Sheets

METHOD FOR CONVERTING AN OBJECT CODE INTO A PROGRAM CODE

BACKGROUND OF THE INVENTION

1. Field of the Invention

The invention is directed to a method for converting an object code for a source hardware into an equivalent program code according to a method for converting object cod for a source hardware into equivalent executable program code for a target hardware where the program code comprises a program part and a program part. In particular, the invention is directed to a method for converting an object code suitable for an earlier processor generation into a program code that is runnable on current hardware platforms.

2. Description of the Related Art

The increasing demands made on the performance capability of computer systems often require a switch to new computer generations, for example from CISC to RISC computers. Since, however, the programs existing for prior computer generations represent great economic value and can be necessary for the smooth execution of company-critical procedures, it is desirable or even indispensable to continue using the existing software base.

Manually rewriting of the programs onto the target hardware is very time-consuming and costly. Different techniques of automatic transformation have therefore been proposed.

When the existing programs or parts thereof are present in the source code of a standardized language, they can usually be converted onto the new target hardware by simple re-compiling. An automatic conversion is likewise possible for application programs that are present as assembler source code for the source hardware. Such a method, which, however, is not provided for the conversion of an object code, is disclosed in German Patent Application DE 196 17 842.

Often, however, user programs are only present in the form of an object code runnable on the source hardware. This is particularly the case for applications that have been modified over the course of years at the object code level. The original source code for such programs—if it is still available—is usually unusable since it does not contain the changes that have been made.

It is known to dynamically transform object code for a source hardware on the target hardware in the fashion of a command interpreter. Such an emulation of the source hardware, however, requires a great deal of computing time which cancel out the higher performance capability of the new hardware. Programs that usually run significantly faster on the target hardware can be produced with methods for static program transformation.

U.S. Pat. No. 5,313,614 discloses a method for static conversion of object code between computer systems having different hardware architectures. In the converted program, a complete image of the address space of the source machine is contained in the RAM of the target machine. This image, for example, contains an image repetition store and addresses for input/output registers. Memory accesses of the converted program occur in the corresponding addresses of the image. Accesses onto addresses that trigger a side affect in the source hardware are thereby intercepted and suitably converted.

This method is therefore provided for the conversion of object code that directly accesses the hardware of the source machine, but is relatively complicated precisely because of the support of hardware-related functions. This is true both with respect to the computing expenditure required for the conversion as well as the implementation of the converted program.

The article, "Binary Translation" by R. L. Sites et al. in the periodical *Communications of the Association for Computing Machinery*, Vol. 36, No. 2, February 1993, pages 69–81, shows a method for binary code conversion in which existing VAX and MIPS programs are converted into binary code for RISC computers. This method comprises converting an object code for a source hardware into an equivalent program code that comprises a program part and a data part, in which a code transformer analyzes each command of the object code for the source hardware and generates at least one corresponding entry from it into the program part of the program code, by which a part of the object code for the source hardware is accepted into the data part of the program code. It also incorporates all of the original object code (data and program part) into the generated binary code. In this method, machine code is generated for alpha-AXP processors in order to obtain an optimally direct imaging of the structures of the source hardware onto structures of the target hardware.

Converting existing CISC object code into optimized RISC code is known from the article, "Migrating a CISC Computer Family onto RISC via Object Code Translation" by K. Andrews et al. in ACM SIGPLAN Notices, Volume 27, No. 9, September 1992, pages 213–222.

The article, "A Methodology for Decompilation" by C. Cifuentes et al. in XIX Conferencia Latinoamericana de Informatica, Buenos Aires, Argentina, August 1993, pages 257–266, first mentions early work in the field of decompiling object code into high-level language source code, in which the authors proposed their own procedure for this decompiling. In this method, a high-level language program code is generated via a plurality of intermediate steps that comprises optimally far-reaching high-level language constructs. Correspondingly, memory accesses of the original object code are converted into global and local variables of the high-language program code.

SUMMARY OF THE INVENTION

The invention, has the object of offering a method for converting of an object code into an equivalent program code that is flexible and efficient in view of the actual conversion of the code and in view of running the converted program code. In particular, the method should be suitable for efficient conversion of object code for user programs, i.e., of non-privileged object code.

This object is inventively achieved by a method for converting an object code for a source hardware into an equivalent program code that may be run on a target hardware and that comprises a program part and a data part. This method comprises the steps of analyzing, by a code transformer, each command of the object code for the source hardware, generating a corresponding entry from the command of the object code in the program part of the program code, accepting a part of the object code for the source hardware into the data part of the program code, in which the part of the object code for the source hardware accepted into the data part of the program code corresponds to a data part of the object code for the source hardware, generating a source code of a high-level programming language as a program part of the program code, and partially retaining access into the data structures of the object code for the source hardware that are contained in the data part of the program code in the source code.

The invention proceeds from the basic idea of converting the object code into an equivalent program code that operates on the data structures of the original code. This avoids the difficult or even unsolvable transformation of data structures of the object code into data structures of another programming language.

The invention makes it possible to transport user programs that, for example, are present in the object code for the system 390 onto other hardware platforms, for example, onto RISC hardware, in a simple way. Since at least one data part of the original object code is accepted into the generated program code, this data part is directly available for memory accesses onto the data structures of the original object code. On the other hand, it is at most the complete object code that is accepted into the program code. An administration of the complete address space of the source hardware—which can be several times greater than the object code and must be monitored for memory accesses having paging effects—is therefore not required.

In the vocabulary employed here, "program code" does not necessarily mean a single data file. On the contrary, the program code can be formed of several parts from which a runnable program is then generated by compiler and/or assembler and/or linking events. Likewise, a program, data or link part does not necessarily mean an interconnected memory area; rather, each of these parts can be formed from a plurality of sections and/or memory areas and/or routines.

Inventively, accesses onto the data structures of the object code for the source hardware are at least partially, but preferably completely retained; a complete retention facilitates the conversion procedure. However, it can also be provided that specific classes of data structures be recognized and these—when possible—be converted in an especially efficient way independently of the original object code.

Preferably, the data part of the converted program code is exclusively formed by the object code for the source hardware or parts thereof and exhibits no further component parts, such as low-level hardware addresses.

Inventively, a source code of a higher programming language is generated as a program part of the converted program code. A higher programming language means a language that comprises constructs such as floating decimal point functions and/or function calls and/or named variables and/or a type system. In particular, the C language or a related programming language is used as the high-level programming language for the program part of the converted program code. The use of such a hardware-independent programming language enhances the flexibility of the method because C-compilers are available for practically all hardware architectures of possible target machines.

In preferred embodiments in which a higher programming language is employed for the program part of the converted program code, the registers of the source hardware are modeled by variables of the higher programming language. Furthermore, procedure and/or function calls can be utilized for simpler and structured simulation of complex commands of the source hardware. These possibilities established by using a higher programming language facilitate the conversion procedure and make it possible that a comparatively assessable program code can be produced. This code can be more easily further-modified by hand as warranted.

Branches in the original object code are preferably implemented via a branch table in the transformed program code. This, is required when the higher programming language employed exhibits only limited branch possibilities.

The method is preferably provided for the conversion of non-privileged object code, since such object code comprises few or no hardware-related commands, which facilitates the conversion procedure.

An analysis of the object code in view of its program and data parts is preferably undertaken. Sections of the original object code that are dependably recognized as program parts need not be accepted into the data part of the generated program code. For sections that are dependably recognized as data parts, no command sequences need to be generated in the program part of the generated program code. Sections that cannot be dependably identified must be incorporated into the data part of the program code and must additionally be inserted as command sequences into the program part of the program code.

In preferred embodiments, the generated program code contains a link part in order to enable mutual calls between converted program code and/or original object code and/or further program modules.

BRIEF DESCRIPTION OF THE DRAWINGS

An exemplary preferred embodiment in the invention, as well as a number of modifications of the embodiment are described in greater detail below with reference to the drawings.

DESCRIPTION OF THE PREFERRED EMBODIMENTS

Figure 1:
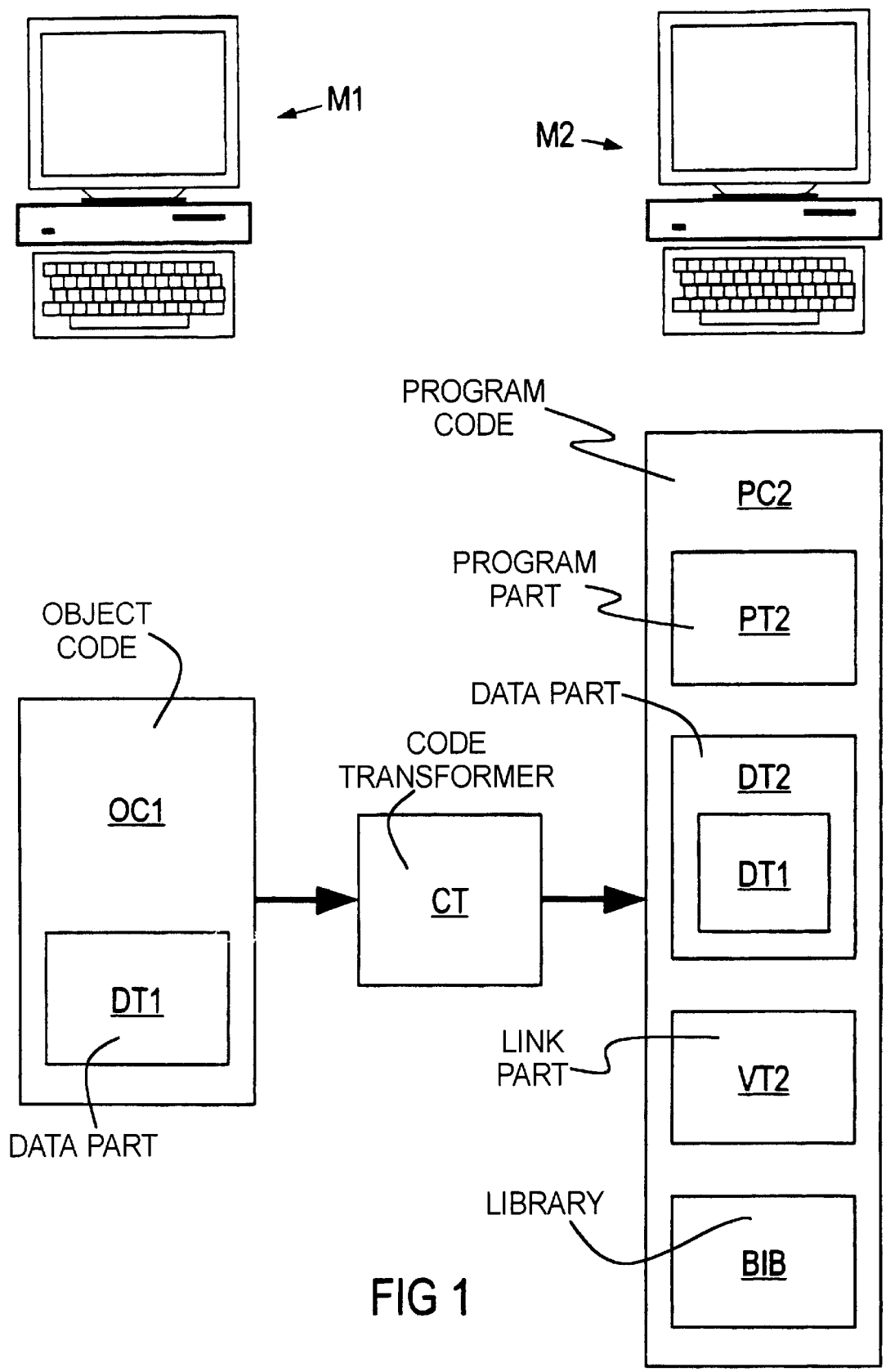
FIG. 1 is a schematic illustration for explaining the basic principle of the inventive method.

In FIG. 1, an object code OC1 runnable on a source hardware M1 is converted with a code transformer CT into a program code PC2 that is provided for a target hardware M2. The object code OC1 comprises a data part DT1 that is distributed into a plurality of individual sections in the object code OC1.

The program code PC2 is composed of a plurality of parts that are stored in separate data files. One program part PT2 contains source code in the programming language C. A data part DT2 contains a complete copy of the data part DT1 of the object code OC1 for the source hardware M1. A link part VT2 enables mutual calls between the program code PC2 and external routines. Further, a library BIB with assembler routines is provided in the program code PC2 for the execution of complex or hardware-related functions (for example, arithmetic functions, particularly floating decimal point arithmetic ). The program code PC2 is not directly executable on the target hardware M2 but must first be compiled (or assembled) and linked.

Figure 2:
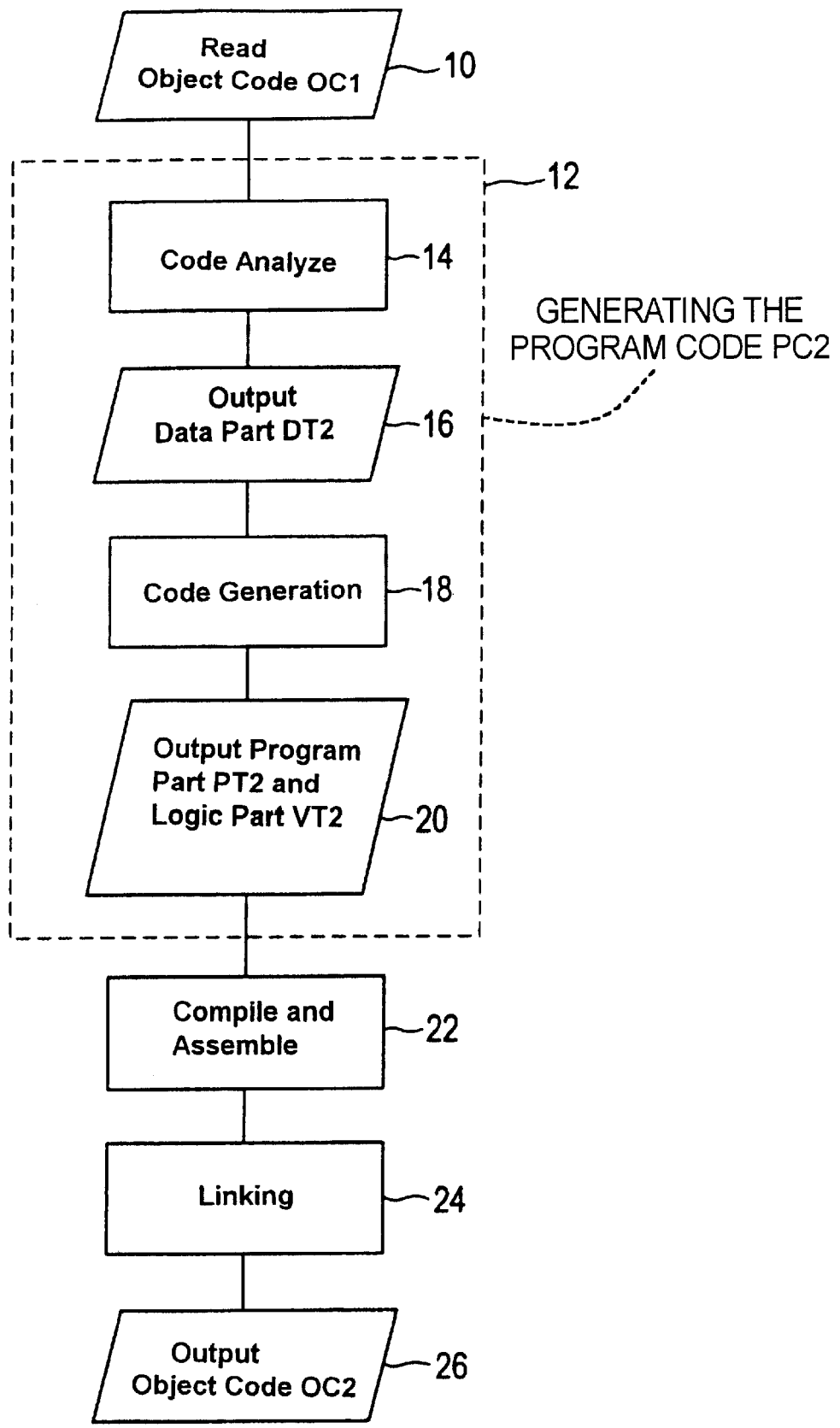
FIG. 2 is a flowchart of the conversion of an object code for a source hardware into an object code for a target hardware.

FIG. 2 shows the procedure of converting the object code OC1 for the source hardware M1 into an object code OC2 for the target hardware M2. In step 10, the original object code OC1 is read in. The steps for generating the program code PC2 are combined in a block 12 in FIG. 2. The read-in-therefor; object code OC1 is first subjected to a code analysis (14). The objective of the code analysis is to resolve the object code OC1 into code and data parts; this, however, is not always possible to do in an unambiguous manner.

In the code analysis in step 14, the possible program execution in the object code OC1 is tracked proceeding from a known start address. To achieve this, the object code OC1 is interpreted command-by-command starting with the start address, and the commands that are reached are identified as such. Unconditional branches are implemented. Each conditional branch, by contrast, opens up two paths that are to be traversed. First, all conditions are assumed to be met. When the program code or a code part that has already been run is reached (the latter is the case for loop branch-backs), the address level is switched back to the conditioned branch executed first, and the alternative path (condition not met) is traversed.

In this way, all conditioned branches are gradually worked off in the manner of a back tracking algorithm, resulting in all possible paths in the object code OC1 being run and marked as commands. In a last step of the code analysis 14, the remaining regions of the object code OC1 that have not been reached are searched for valid operation codes. Regions that were not reached in the traversal but contain an accumulation of valid command codes, are interpreted as not being unambiguously classifiable because they could be potentially reachable in the program run by branches having a calculated branch destination.

As a result of the code analysis 14, parts of the object code OC1 are classified as data, parts are classified as code and parts are classified as not reliably classifiable. The sections that are not reliably classifiable are converted both into C-code and are also accepted into the data part DT2. The data part DT2 can thereby possibly be more extensive than necessary, and the C-code in the program part PT2 can contain "dead" code. The correctness of the converted program code PC2, however, remains assured.

In alternative embodiments, other methods and other heuristics can be utilized for determining the data encode sections of the object code OC1. In another alternative embodiment, the code analysis 14 is foregone and the complete object code OC1 is accepted in the data part DT2 of the program code PC2 and is converted as C-code in the program part PT2. In an alternative procedure, the result of the code analysis 14 can be utilized only for determining the code part or the data part DT1 of the object code OC1. The complete object code OC1 is then employed as the other respectively part.

The data part DT1 of the object code OC1 identified in the code analysis 14 and that can be composed of a plurality of sections is output into a data file as a data part DT2 in step 16.

In step 18, the program part PT2 and the link part VT2 of the program code PC2 are generated from the object code OC1 and the information acquired in the code analysis 14. Details of this procedure are described below. The parts PT2 and VT2 of the program code PC2 are output into separate data files in step 20.

In step 22, the program part PT2 is compiled with a known C-compiler, and the assembler routines in the link part VT2 are converted into object code with an assembler known in and of itself In step 24, the modules generated in the steps 16 and 22 as well as the globally prescribed library BIB specific for the target hardware M2 are bound. The resulting object code OC2 runnable on the target hardware M2 is output in step 26.

Figure 3:
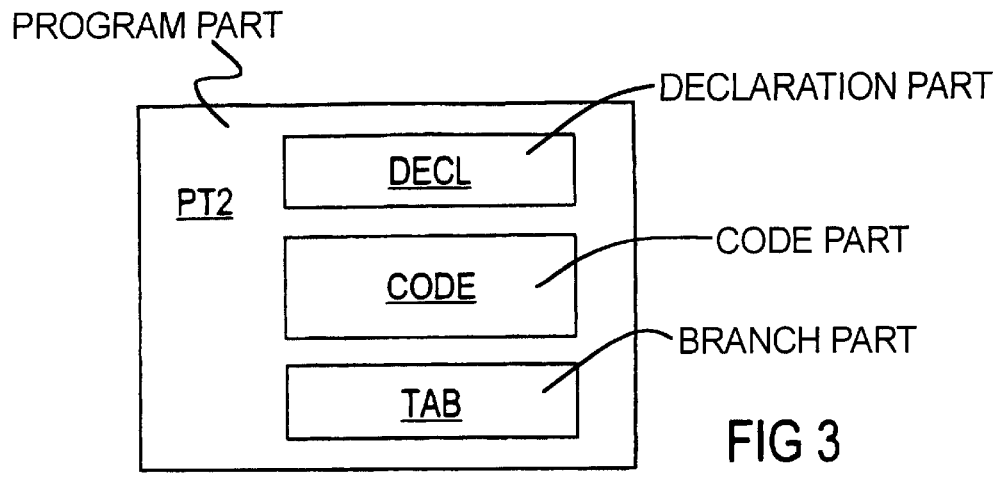
FIG. 3 is a schematic illustration of the program part generated by the conversion.

The program part PT2 generated in the code generation in step 18 (FIG. 2) comprises the structure illustrated in FIG. 3. Stated more precisely, the program part PT2 is composed of a declaration part DECL, of a code part CODE and of a branch table TAB. The case of an independently executable program part PT2 is considered first. Such a program part PT2 is fashioned as the "main" module of the language C.

The declaration part DECL contains definitions of data structures that simulate the non-privileged hardware structures of the source machine M1. Because the conversion method is only provided for non-privileged commands, only a few types of processor registers need to be simulated (for example, general registers and condition code registers). For the sake of simplicity, the data structures for processor registers are defined as a union set of all data types that the registers can contain. This is expressed in the following, exemplary type definition in the language C:

typedef union genregs {
   unsigned long int u;
   long int s;
   unsigned char *p;
   } REGS390;

Corresponding declarations are placed into the declaration part DECL for the individual registers, for example:

define MAX390REGS 20
REG390 r[MAX390REGS];

In order to generate the code part CODE, corresponding commands of the language C are generated for each command of the object code OC1. Which sections of the object code OC1 are to be interpreted as commands is defined from the result of the code analysis 14. In the exemplary embodiment described here, all sections of the object code OC1 are translated that have not been dependably identified as data of the data part DT1.

A group of C-commands is generated in the code part CODE for each assembler command in the object code OC1, namely, first, an unambiguous label (branch destination mark), then a conversion of the assembler command and, finally, commands for simulating side effects of the assembler command. The generated C-commands reflect the transformations that the converted assembler command executes on the registers and in the memory of the source hardware M1.

The label generated for each assembler command is derived from the address of the converted assembler command. Furthermore, this address is also defined as a symbolic designation in a hexadecimal notation. The label and the symbolic designation are employed in the branch destination table TAB (which will be explained below). The following entries are therefore first generated in the code part CODE for a command that is located in the object code OC1 at the hexadecimal address 201A:

L_201A;
define L_201A 8218 the assembler command is now converted, in that its effect on the registers and in the memory of the source hardware M1 is simulated by C-commands. For example, the object code for the register subtraction command

SR R3, R2 is converted into the C-notation $$r[3].s\mathrel{-}=r[2].s.$$

In order to simulate side affects of the assembler commands in the object code OC1, a few further elements of the source hardware M1 must be simulated in addition to the general registers, such as a condition code register that automatically changes dependent on the result of specific commands and is interrogated for conditioned branches. For the register subtraction command described here by way of example, the following C-code is therefore additionally generated for setting the condition code register r[CC]:

r[CC] .s = ( (r[3] .s == r[2] .s)

? 0

: ( (r[3] .s < r[2] .s)? 1 : 2) ).

In the exemplary embodiment described here, C-commands that suitably simulate the status of the condition code register and other special registers of the source hardware M1 are always generated in the conversion of a command of the object code OC1. For the non-privileged programs exclusively under consideration here, however, only a few hardware structures of the source hardware MI need to be modeled.

In order to enhance the implementation speed of the converted program, optimizations are provided in alternative embodiments. For example, for a plurality of sequentially executed commands before a conditioned branch command, the conditioned code has to be generated only for the last command before the branch instruction, since all earlier condition codes are thereby overwritten.

In the conversion of the object code OC1, accesses into memory areas of the source hardware M1 are imaged onto corresponding accesses in the data part DT2 of the program code PC2. Thus, for example, the object code for the register load instruction

L R2,ENDAREA is converted into the C-code r[3].u=*(unsigned long int *) (r[10].u+226);

where R10 serves as base register and 226 is the offset of the symbolic address ENDAREA in decimal notation. The condition code register in the assembler language described here by way of example is not modified for load instructions.

Hardware-related commands in the object code OC1, which cannot be completely imaged by C-commands, are converted in that a call of an assembler routine from the library BIB is incorporated into the code part CODE. The library BIB is permanently prescribed for the target hardware M2 and contains entries for those commands of the source hardware M1 that are to be implemented directly by machine code of the target hardware M2. Among the non-privileged commands to be converted here, however, only a few require a call of the assembler library BIB (for example, synchronization commands for the memory access).

For conversion of branch instructions in the object code OC1, the module-global branch table TAB is employed in the generated program part PT2. The branch table TAB contains a branch instruction ("switch") of the language C that, for each instruction address of the object code OC1, comprises an entry ("case") with the branch destination address of this instruction. The labels defined in the code part CODE are entered into the branch table TAB as branch destinations, whereas the symbolic designations determined with #define serve for better readability of the branch destination addresses. An exemplary excerpt from a branch table TAB is shown below:

BranchTab:
switch (branch destination) {
    case L__2018: {goto 1__2018:}
    case L__201A: {goto 1__201A:}
    case L__201E: {goto 1__201E:}

In order to implement a branch in the converted C-code, a branch destination address is calculated and a branch is made to the branch table TAB. For example, an unconditioned branch instruction to a symbolic mark START0 with the decimal offset 14 is converted into the C-code branch destination=r[10].u+14;
goto BranchTAb;

where R10 contains a base address. For conditional branches, a corresponding if/then command is generated in the code part CODE, the "if" part comprising, for example, an interrogation of the conditioned code register.

In alternative embodiments, information are determined in the code analysis (step 14 in FIG. 2) regarding which commands of the original object code OC1 are possible branch destinations. In this case, only the possible branch destinations need be identified with a label in the program part PT2, resulting in the control flow becoming substantially more efficient. The possibilities of optimization by the C-compiler are exploited better since each group of C-commands generated from a command in the original object code OC1 no longer has to be isolated with a label.

In further alternative embodiments, another high-level programming language or an assembly language serves as the language for the generated program part PT2. When, in this latter case, the assembler language of the source hardware M1 is used, a disassembler functionality is achieved by the method. The assembler source code generated in this way can be manually modified or can be converted with other methods.

The conversion method discussed above shows how, a completely bound object code can be completely converted into a C-program. The C-program has the form shown in FIG. 3, with a "main" function that potentially calls further functions serving for classification. In the more complex, general case, the object code OC1 to be converted, however, only forms a part of a larger program system that should cooperate, with the other modules. The other modules can likewise be converted by the method disclosed here. However, for example, they can also be dynamically interpreted on the target hardware M2.

In order to enable a mutual program call between the modules converted by the method disclosed here and potentially other modules, assembler routines are used that are inserted into the link part VT2 by the code transformer CT in the code generation (step 18 in FIG. 2). Furthermore, the generated program part PT2 no longer comprises a "main" module but only a normal C-function. For a call from the outside, the images of the hardware registers of the source machine M1 as well as auxiliary information about the desired point of entry are handed over, as shall be described in greater detail below.

Figure 4:
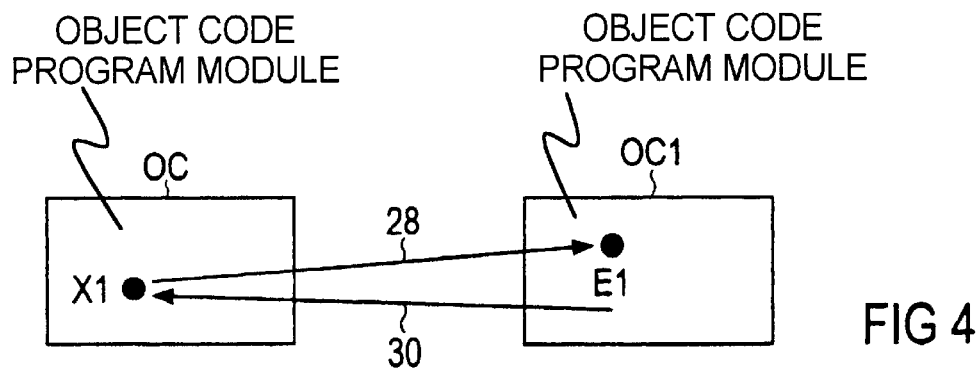
FIG. 4 is a schematic illustration of call relationships between two object code modules.

Given the program system for the source hardware M1 shown in FIG. 4, two object code program modules OC and OC1 are provided. The module OC1 has a point of entry E1 that is branched to from the module OC by a call 28. After processing a suitable function, a branch-back 30 take place from the module OC1 to a point X1 of the module OC.

Figure 5:
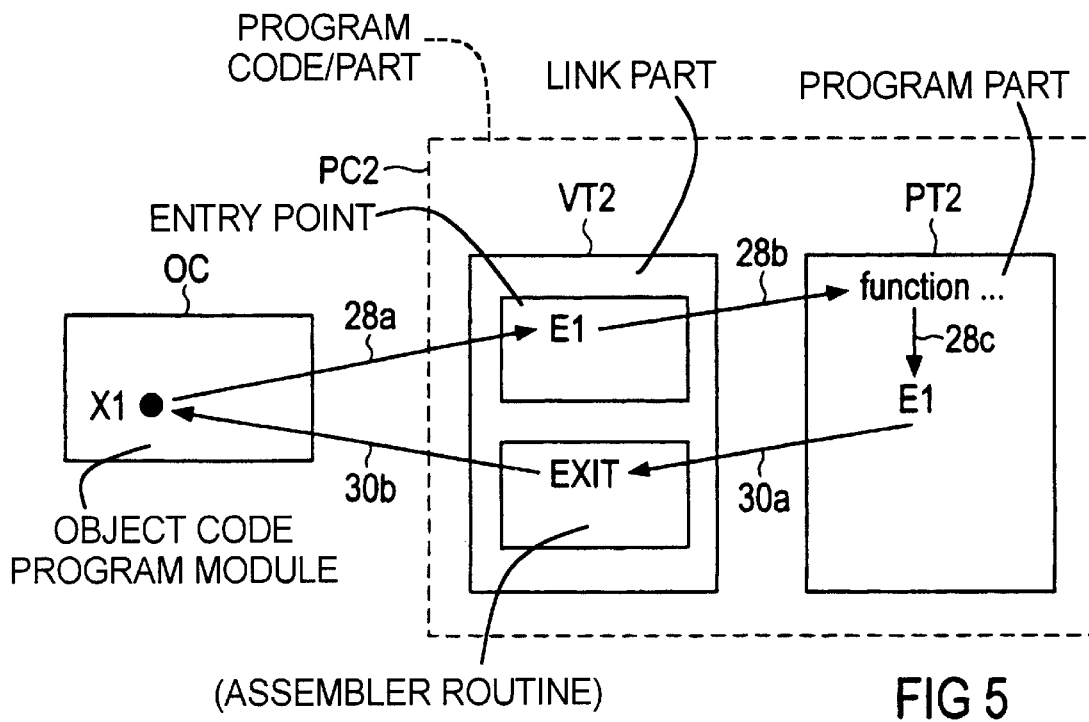
FIG. 5 is an illustration according to FIG. 4, whereby one of the object code modules has been converted into a program code.

Of the two modules OC and OC1, only the module OC1 is to be converted into an equivalent program code PC2, as shown in FIG. 5. In order to enable the mutual calls between the module OC and the program code PC2, the code transformer CT generates a plurality of assembler routines in the link VT2.

When a function of the program code PC2 is to be called from the object code OC, the current status of the hardware register at the point in time of the call must be handed over to the C-program part PT2 in the form of a parameter. Furthermore, the address of the entry point E1 must be handed over a parameter in order to be able to branch to this point of entry E1 in the program part PT2.

Stated more precisely, the call 28 of FIG. 4 is subdivided in three steps shown in FIG. 5. In the first step 28*a*, the point of entry E1 from the object code module OC is called in the assembler code of the link part VT2. This assembler code implements a call 28*b* of the (only) C-function contained in the program part PT2 with the current values of the hardware registers and the address of the point of entry E1 as parameters. The branch 28*c* is implemented with a branch table according to the transmitted point of entry address.

When, in contrast, a routine in the object code OC is to be called from the program part PT2, as is the case in FIG. 4 given the branch back 30, the current register status, as maintained in the program part PT2 in C-variables, must be handed over to the called assembler program. This call takes place in two steps 30*a* and 30*b* shown in FIG. 5.

In step 30*a*, an assembler routine EXIT is called in the link part VT2. The current values of the register variables and the destination address in the object code OC are handed over to the routine EXIT as parameters. The assembler routine EXIT now loads the hardware registers of the target machine M2 with the current values and, in step 30*b*, branches to the desired destination address, the address X1 here.

When the program part PT2 comprises a plurality of entry points, a corresponding plurality of entry points are provided in the link part VT2. For a branch in the program code PC2, the destination address in the program part PT2 is set only by the assembler routine in the link part VT2 that is branched to. In contrast to this, the destination address is handed over as parameter for a branch from the program part PT2, so that a single routine EXIT suffices.

Mutual calls between an arbitrary number of modules are possible according to the method described here.

In this exemplary embodiment, mutual calls also take place between program parts that have both been converted according to the inventive method, taking place via the assembler routines of the link part VT2. In alternative embodiments, this situation is recognized for optimization and is converted into a direct C-function call.

What is claimed is:

1. A method for converting an object code for a source hardware into an equivalent program code compatible with a target hardware and that comprises a program part and a data part, comprising the steps of:

analyzing, by a code transformer, each command of said object code for said source hardware;

generating a corresponding entry from said command of said object code in said program part of said the program code;

accepting a part of said object code for said source hardware into said data part of said program code wherein the part of said object code for said source hardware accepted into the data part of said program code corresponds to a data part of said object code for said source hardware;

generating a source code of a high-level programming language as a program part of said program code;

partially retaining access into said data structures of said object code for said source hardware that are contained in said data part of said program code in said source code; and converting registers of said source hardware as variables of said high-level programming language.

2. A method according to claim 1, further comprising the step of forming said data part of said converted program code exclusively by parts of said object code for said source hardware.

3. A method according to claim 1, further comprising the step of generating a source code of the C-language as a program part of said converted program code.

4. A method according to claim 3, further comprising the step of converting predetermined commands of said object code for said source hardware as a function or procedure calls of said high-level programming language.

5. A method according to claim 1, further comprising the step of sequencing branch commands of said object code for said source hardware utilizing a branch table of said program code.

6. A method according to claim 1 further comprising the step of analyzing said object code for said source hardware in order to identify a data part of said object code for said source hardware.

7. A method according claim 1, further comprising the step of enabling branches into said generated program code or out of said generated program code via a link part of said generated program code.

8. A method according to claim 1, further comprising the step of converting said generated program code by compilers or assemblers or linking into an object code executable on said target hardware.

9. A method for converting an object code for a source hardware into an equivalent program code compatible with a target hardware and that comprises a program part and a data part, comprising the steps of:

analyzing, by a code transformer, each command of said object code for said source hardware;

generating a corresponding entry from said command of said object code in said program part of said the program code;

accepting a part of said object code for said source hardware into said data part of said program code wherein the part of said object code for said source hardware accepted into the data part of said program code corresponds to a data part of said object code for said source hardware;

generating a source code of a high-level programming language as a program part of said program code;

partially retaining access into said data structures of said object code for said source hardware that are contained in said data part of said program code in said source code;

wherein said method is utilized for converting non-privileged object code.

10. A method according to claim 9, further comprising the step of converting registers of said source hardware as variables of said high-level programming language.

\* \* \* \* \*

UNITED STATES PATENT AND TRADEMARK OFFICE
CERTIFICATE OF CORRECTION

PATENT NO. : 6,279,150 B1
DATED : August 21, 2001
INVENTOR(S) : Bachmann

It is certified that error appears in the above-identified patent and that said Letters Patent is hereby corrected as shown below:

<u>Title page,</u>
The PCT filing date should read -- August 17, 1998 --

Signed and Sealed this

Nineteenth Day of March, 2002

Attest:

Attesting Officer

JAMES E. ROGAN
*Director of the United States Patent and Trademark Office*